US012595022B2

(12) United States Patent
Jordan

(10) Patent No.: US 12,595,022 B2
(45) Date of Patent: Apr. 7, 2026

(54) BICYCLE CONTROL SYSTEM

(71) Applicant: SRAM, LLC, Chicago, IL (US)

(72) Inventor: Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 187 days.

(21) Appl. No.: 18/479,231

(22) Filed: Oct. 2, 2023

(65) Prior Publication Data

US 2025/0108882 A1      Apr. 3, 2025

(51) Int. Cl.
*B62M 6/50* (2010.01)
*B62J 45/411* (2020.01)
*B62J 45/412* (2020.01)
*B62J 45/414* (2020.01)

(52) U.S. Cl.
CPC .............. *B62M 6/50* (2013.01); *B62J 45/411* (2020.02); *B62J 45/412* (2020.02); *B62J 45/414* (2020.02)

(58) Field of Classification Search
None
See application file for complete search history.

(56) References Cited

U.S. PATENT DOCUMENTS 5,971,090 A    10/1999  Tanaka
6,320,336 B1 * 11/2001  Eguchi .................... B60L 50/20
                                                      318/489

2005/0140113 A1 *  6/2005  Kokatsu ............. A63B 22/0605
                                                      280/205
2011/0303474 A1    12/2011  Kimmich
2017/0225742 A1 *  8/2017  Hancock .................. B62M 6/45
2019/0176930 A1 *  6/2019  Wiegel .................... F16D 41/24
2019/0291812 A1 *  9/2019  Tsuchizawa ............ B62M 6/55
2022/0001956 A1 *  1/2022  Mercat .................... F16D 43/22

FOREIGN PATENT DOCUMENTS

AU        2020202934            5/2020
DE        102021117309 A1 *   1/2023   .............. B62M 6/45
DE        102022107155          9/2023
TW        202315799            4/2023
WO        2015039132            3/2015
WO        2023280743            1/2023
WO        WO-2023180538 A1 *   9/2023   .............. B62M 6/55
WO        2024103155            5/2024

OTHER PUBLICATIONS

Merged DE102021117309 (Year: 2023).*
Merged WO2023180538 (Year: 2023).*

* cited by examiner

*Primary Examiner* — Daniel L Greene

(57)              ABSTRACT

An electronic component for an electric bicycle is provided. The electric bicycle includes a transmission. The electronic component includes a processor configured to identify an operating condition of the electric bicycle, determine transmission losses of the transmission of the electric bicycle based on the identified operating condition, and control an assist motor of the electric bicycle based on the determined transmission losses.

19 Claims, 7 Drawing Sheets

BICYCLE CONTROL SYSTEM

BACKGROUND

1. Field of the Disclosure

The present disclosure is generally directed to an electric bicycle, and more particularly, to control of the electric bicycle.

2. Description of Related Art

A bicycle with a pedal assist electric motor (e.g., an electric bicycle or an e-bike) may be required by law to not provide motor assistance to a rider if the electric bicycle is traveling above a speed threshold (e.g., 25 km/h). To prevent motor assistance above the speed threshold, a bicycle control system is to have information about a speed of the electric bicycle. Bicycle speed information is typically provided by a sensor (e.g., reed switch, Hall effect) mounted in proximity to a rear wheel, which detects a magnet mounted to the rear wheel, for example.

An electric bicycle may include a number of rider selectable support levels. For example, "Eco mode" may provide 40% support, "Tour mode" may provide 100% support, "Sport mode" may provide 170% support, and "Turbo mode" may provide 250% support. As an example, if the rider selects "Tour mode," and is riding below the speed threshold and inputting 100 Watts of power to pedals of the electric bicycle, an assist motor of the electric bicycle may also provide 100 Watts to a rear wheel of the electric bicycle. This results in a total output power of the electric bicycle of 200 Watts.

The electric bicycle may include a transmission to provide a comfortable pedaling cadence for varying riding conditions and speeds for the number of rider selectable support levels. The transmission may provide a plurality of gear ratios to the rider to provide the comfortable pedaling cadence for the rider.

SUMMARY

In one example, an electronic component for an electric bicycle is provided. The electric bicycle includes a transmission. The electronic component includes a processor configured to identify an operating condition of the electric bicycle, determine transmission losses of the transmission of the electric bicycle based on the identified operating condition, and control an assist motor of the electric bicycle based on the determined transmission losses.

In one example, the processor being configured to identify the operating condition of the electric bicycle includes the processor being configured to identify an input torque at a crank assembly of the electric bicycle. The processor being configured to determine the transmission losses of the transmission of the electric bicycle based on the identified operating condition includes the processor being configured to determine the transmission losses of the transmission of the electric bicycle based on the identified input torque at the crank assembly of the electric bicycle.

In one example, the processor being configured to identify the input torque at the crank assembly of the electric bicycle includes the processor being configured to receive torque data from an input power sensor at the crank assembly of the electric bicycle. The torque data represents the input torque at the crank assembly.

In one example, the processor being configured to determine the transmission losses of the transmission of the electric bicycle based on the identified input torque includes the processor being configured to identify a cadence of the crank arm assembly of the electric bicycle and determine an input power based on the identified input torque and the identified cadence. The processor being configured to determine the transmission losses of the transmission of the electric bicycle based on the identified input torque further includes the processor being configured to determine an output power for the electric bicycle and determine a difference between the determined input power and the determined output power. The determined difference between the determined input power and the determined output power represent the transmission losses of the transmission of the electric bicycle. The processor being configured to control the assist motor of the electric bicycle based on the determined transmission losses includes the processor being configured to control the assist motor of the electric bicycle based on the determined difference.

In one example, the processor being configured to determine the output power for the electric bicycle includes the processor being configured to receive power data from a power sensor of the electric bicycle. The power data represents the output power for the electric bicycle.

In one example, the processor being configured to control the assist motor of the electric bicycle based on the determined difference includes the processor being configured to control the assist motor of the electric bicycle based on a predetermined portion of the determined difference.

In one example, the processor is further configured to identify a speed of the electric bicycle and compare the identified speed of the electric bicycle to a predetermined maximum threshold speed. The processor being configured to control the assist motor of the electric bicycle based on the determined transmission losses includes the processor being configured to control the assist motor of the electric bicycle based on the determined transmission losses when, based on the comparison, the identified speed of the electric bicycle is greater than the predetermined maximum threshold speed.

In one example, the processor being configured to identify the speed of the electric bicycle includes the processor being configured to receive speed data from a speed sensor of the electric bicycle. The speed data represents the speed of the electric bicycle.

In one example, the speed sensor includes a rotational wheel speed sensor, a global positioning system (GPS) sensor, an accelerometer-based speed sensor, or any combination thereof.

In one example, the electronic component further includes a memory configured to store a plurality of predetermined transmission losses and a plurality of operating conditions corresponding to the plurality of predetermined transmission losses, respectively. The processor being configured to determine the transmission losses of the transmission of the electric bicycle based on the identified operating condition includes the processor being configured to compare the identified operating condition of the electric bicycle to the plurality of operating conditions, and identify the transmission losses of the transmission of the electric bicycle from the plurality of predetermined transmission losses based on the comparison.

In one example, the plurality of operating conditions corresponding to the plurality of predetermined transmission losses includes input torque at a crank assembly of the electric bicycle, cadence of the crank assembly of the electric bicycle, speed of the electric bicycle, temperature, or any combination thereof.

In one example, a controller for an assist motor of an electric bicycle is provided. The electric bicycle includes a transmission. The controller includes a processor configured to identify an input torque at a crank assembly of the electric bicycle, identify a speed of the electric bicycle, and compare the identified speed of the electric bicycle to a predetermined maximum threshold speed. The processor is further configured to determine transmission losses of the transmission of the electric bicycle based on the identified input torque and control the assist motor of the electric bicycle based on the determined transmission losses when, based on the comparison, the identified speed of the electric bicycle is greater than the predetermined maximum threshold speed. The processor is further configured to control the assist motor of the electric bicycle based on the identified input torque when, based on the comparison, the identified speed of the electric bicycle is less than the predetermined maximum threshold speed.

In one example, the processor is further configured to identify a mode for the electric bicycle. The mode is selectable by a rider. The processor is further configured to identify a support level to be provided by the assist motor based on the identified mode. The support level is a percentage of the identified input torque to be provided as additional power by the assist motor. The processor being configured to control the assist motor of the electric bicycle based on the identified input torque includes the processor being configured to control the assist motor of the electric bicycle based on a product of the identified input torque and the identified support level to be provided by the assist motor.

In one example, the processor being configured to determine the transmission losses includes the processor being configured to determine an input power based on the identified input torque and a cadence of the crank arm assembly of the electric bicycle, determine an output power for the electric bicycle, and determine a difference between the determined input power and the determined output power. The determined difference between the determined input power and the determined output power represents the transmission losses of the transmission of the electric bicycle. The processor being configured to control the assist motor of the electric bicycle based on the determined transmission losses includes the processor being configured to control the assist motor of the electric bicycle based on the determined difference.

In one example, the controller further includes a memory configured to store a plurality of predetermined transmission losses and a plurality of operating conditions corresponding to the plurality of predetermined transmission losses, respectively. The processor being configured to determine the transmission losses includes the processor being configured to compare the identified input torque at the crank assembly of the electric bicycle to the plurality of operating conditions, and identify the transmission losses of the transmission of the electric bicycle from the plurality of predetermined transmission losses based on the comparison.

In one example, the processor being configured to identify the input torque at the crank assembly of the electric bicycle includes the processor being configured to receive torque data from an input power sensor at the crank assembly of the electric bicycle. The torque data represents the input torque at the crank assembly. The processor being configured to identify the speed of the electric bicycle includes the processor being configured to receive speed data from a speed sensor of the electric bicycle. The speed data represents the speed of the electric bicycle.

In one example, a system for controlling an electric bicycle is provided. The electric bicycle includes a transmission. The system includes a first sensor configured to generate input torque data, a second sensor configured to generate bicycle speed data, and a processor in communication with the first sensor and the second sensor. The processor is configured to receive the input torque data from the first sensor. The input torque data represents an input torque at a crankarm assembly of the electric bicycle. The processor is further configured to receive the bicycle speed data from the second sensor. The bicycle speed data represents a speed of the electric bicycle. The processor is further configured to compare the speed of the electric bicycle to a predetermined maximum threshold speed. The processor is further configured to determine transmission losses of the transmission of the electric bicycle based on the input torque and control an assist motor of the electric bicycle based on the determined transmission losses when, based on the comparison, the speed of the electric bicycle is greater than the predetermined maximum threshold speed.

In one example, the processor is further configured to control the assist motor of the electric bicycle based on the input torque when, based on the comparison, the identified speed of the electric bicycle is less than the predetermined maximum threshold speed.

In one example, the processor being configured to determine the transmission losses of the transmission of the electric bicycle based on the input torque includes the processor being configured to determine an input power based on the input torque and a cadence of the crank arm assembly of the electric bicycle, determine an output power for the electric bicycle, and determine a difference between the determined input power and the determined output power. The difference between the determined input power and the determined output power represents the transmission losses of the transmission of the electric bicycle. The processor being configured to control the assist motor of the electric bicycle based on the determined transmission losses includes the processor being configured to control the assist motor of the electric bicycle based on the determined difference.

In one example, the processor being configured to determine the output power for the electric bicycle includes the processor being configured to receive power data from a power sensor of the electric bicycle. The power data represents the output power for the electric bicycle. The output power sensor is positioned at an output of the transmission, within a hub of a rear wheel of the electric bicycle, or on a frame of the electric bicycle.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
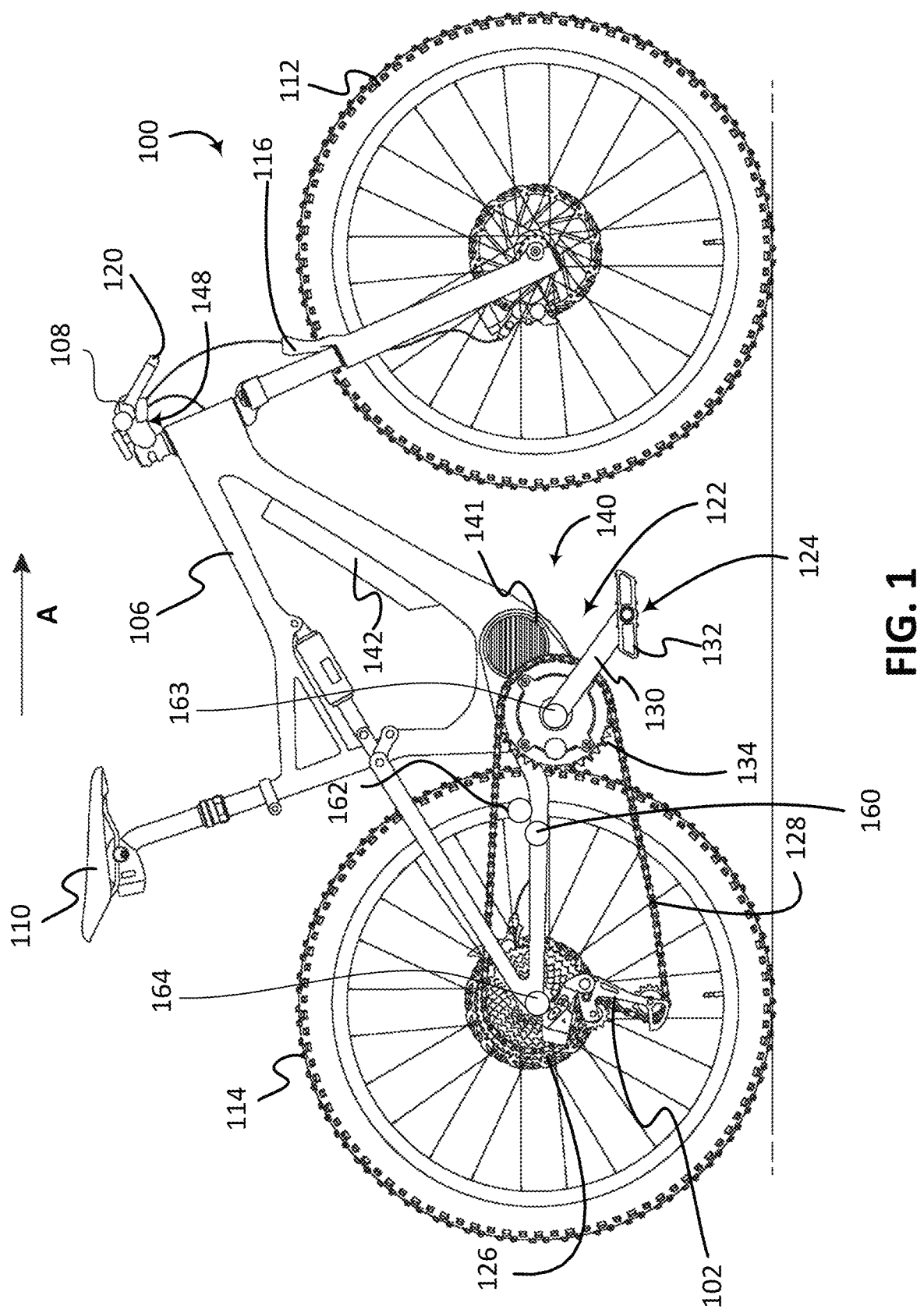
FIG. 1 shows a side view of one example of an electric bicycle with component motion that may be controlled in accordance with the teachings of this disclosure.

A bicycle (e.g., an electric bicycle) with an electric pedal assist motor capable of driving a chainring independent of cranks is provided. The electric bicycle includes a transmission that provides a plurality of gear ratios to a rider. The plurality of gear ratios provide a comfortable pedaling cadence for varied riding conditions and speeds.

The transmission of the electric bicycle has losses that may range from 1% to 15% or more. Due to an increased weight of an electric bicycle compared to a regular bicycle, and due to the transmission losses, the electric bicycle may require considerable effort by the rider to ride at a speed above the speed threshold (e.g., 25 km/h).

Control of the electric bicycle of the present embodiments includes determining transmission losses for the transmission of the electric bicycle, and controlling an assist motor of the electric bicycle, such that mechanical drive power to a wheel (e.g., a rear wheel) of the electric bicycle that is less than or equal to the determined transmission losses is provided when the rider is riding the electric bicycle at a speed greater than the speed threshold. In other words, above the speed threshold, almost all (e.g., 95%, 97%, or 99%) power input into the pedals is transferred to the rear wheel, for example.

At a rider input (e.g., the pedals), the rider pedals the electric bicycle in a typical manner. The pedals drive the rear wheel through the transmission. The transmission may include multiple gears (e.g., a multi-gear transmission) to provide a desirable cadence for various speeds and conditions. The multi-gear transmission may include external gears (e.g., chain, derailleurs, a number of coaxial sprockets), internally geared rear hubs, spur-gear clusters within a drive unit, continuously variable (CV) transmissions, and/or virtual electronic transmissions.

The electric bicycle may also include the assist motor. The assist motor may drive the rear wheel through the multi-gear transmission. Alternatively, the assist motor may include a gear reduction to allow the assist motor to provide additional torque to the transmission or the rear wheel.

The electric bicycle may include speed sensors, input power sensors (e.g., crank cadence and crank torque sensors), and output power sensors. The speed sensors are configured to measure a speed of the electric bicycle and may include, for example, rotational wheel speed sensors, global positioning system (GPS) sensors, and/or accelerometer-based speed sensors. The input power sensors are configured to measure an input cadence and an input torque from the rider. The input power sensors or a controller of the electric bicycle (e.g., a motor controller) may determine an input power based on the measured input cadence and the measured input torque. The output power sensors are configured to measure an output angular speed and an output torque. The output power sensors or a controller of the electric bicycle (e.g., the motor controller) may determine an output power based on the measured output angular speed and the measured output torque. The output power sensors may be located at, for example, an output of the transmission, within a hub of the rear wheel, and/or a frame of the bicycle.

The output of the assist motor is controlled by the motor controller, for example. The motor controller receives, for example, bicycle speed data from the speed sensors, rider input power from the input power sensors, and output power from the output power sensors. The motor controller is configured to control the assist motor to assist the rider in propelling the electric bicycle by adding power to drive the rear wheel of the electric bicycle, for example.

The transmission losses may be determined in a number of ways. For example, the transmission losses may be characterized in a laboratory over a number of different operating conditions (e.g., input torque, input cadence, speed of the electric bicycle, and/or temperature) This information may be stored in a memory of the motor controller, and the motor controller may estimate the transmission losses for a particular sensed riding condition using the stored information.

As another example, the transmission losses may be measured directly by comparing the determined input power from the input power sensors to the determined output power from the output power sensors. The motor controller may determine a difference between the determined input power and the determined output power, and the determined difference may be identified as the transmission losses.

The estimated transmission losses may be reduced by a predetermined margin to provide that a total power delivered to the rear wheel (e.g., the output power), for example, does not exceed the input power by the rider at a crank arm assembly of the electric bicycle. For example, the estimated transmission losses may be reduced by 5% or another amount, and the motor controller may control the assist motor of the electric bicycle based on the reduced estimated transmission losses. In other words, the motor controller may control the assist motor of the electric bicycle based on a portion (e.g., 95%) of the estimated transmission losses.

The power assist provided by the assist motor of the electric bicycle when the electric bicycle is traveling faster than the speed threshold counteracts the transmission losses and allows all or almost all (e.g., 95%, 97%, or 99%) of power input by the rider into the pedals of the electric bicycle to be transferred to, for example, the rear wheel of the electric bicycle.

These and other objects, features, and advantages of the disclosed bicycle component control will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 illustrates an example bicycle 100 (e.g., e-bike or electric bicycle) that includes a frame 106, handlebars 108, and a seat 110. The bicycle 100 also includes a first or front wheel 112 and a second or rear wheel 114. A front brake 116 and/or a rear brake 118 are included to brake the front wheel 112 and the rear wheel 114, respectively. The front brake 116 and/or the rear brake 118 are controlled by at least one brake actuator 120. The bicycle 100 includes a drive train 122 (e.g., components of which form at least part of a transmission). The drive train 122 of FIG. 1 includes a crank assembly 124 operatively coupled to a rear cassette 126 via a chain 128. The crank assembly 124 includes crank arms 130 and pedals 132, as well as at least one chainring 134 configured to operatively couple with the chain 128 to transmit force and/or power exerted onto the crank assembly 124 to the chain 128. This force and/or power is transmitted to the rear cassette 126 by the chain 128, whereby a motivating force 136 and/or power is transmitted to the rear wheel 114 from the rear cassette 126. While the drive train 122 includes a gear changer (e.g., a rear derailleur 102 in the illustrated embodiment), other transmissions such as an internal gear hub, a gear box, and/or a continuously variable transmission may be applied to the bicycle 100.

The drive train 122 may also include a power assist device 140. Pedaling torque is applied to the crank assembly 124 by a rider using the pedals 132 and crank arms 130. The power assist device 140 is configured to assist the rotation of the rear wheel 114. In the illustrated embodiment, the power assist device 140 is configured to assist the rotation of the rear wheel 114 via a coupled connection to the crank assembly 124. The power assist device 140 includes a power assist motor 141 that is powered by a remote power source 142.

The chain 128 may be moved between individual sprockets of the rear cassette 126 using the gear changer, such as the rear derailleur 102, as shown in FIG. 1. The rear derailleur 102, for example, is an electric gear changer that is controlled by signals indicating that a shift command has been actuated by the bicycle operator, or rider. The electric rear derailleur 102 may be alternatively powered by an integrated power source or the remote power source 142, using a power conductive connector or cable. The power is provided from the remote power source 142, for example, through the cable, to an intermediate power connector that is coupled to the rear derailleur 102. The shift commands are implemented using an electric actuator 148 that is manually operable by the rider. The signals indicating the shift commands may be communicated to the electric rear derailleur 102 using wired and/or wireless communication techniques.

Figure 2:
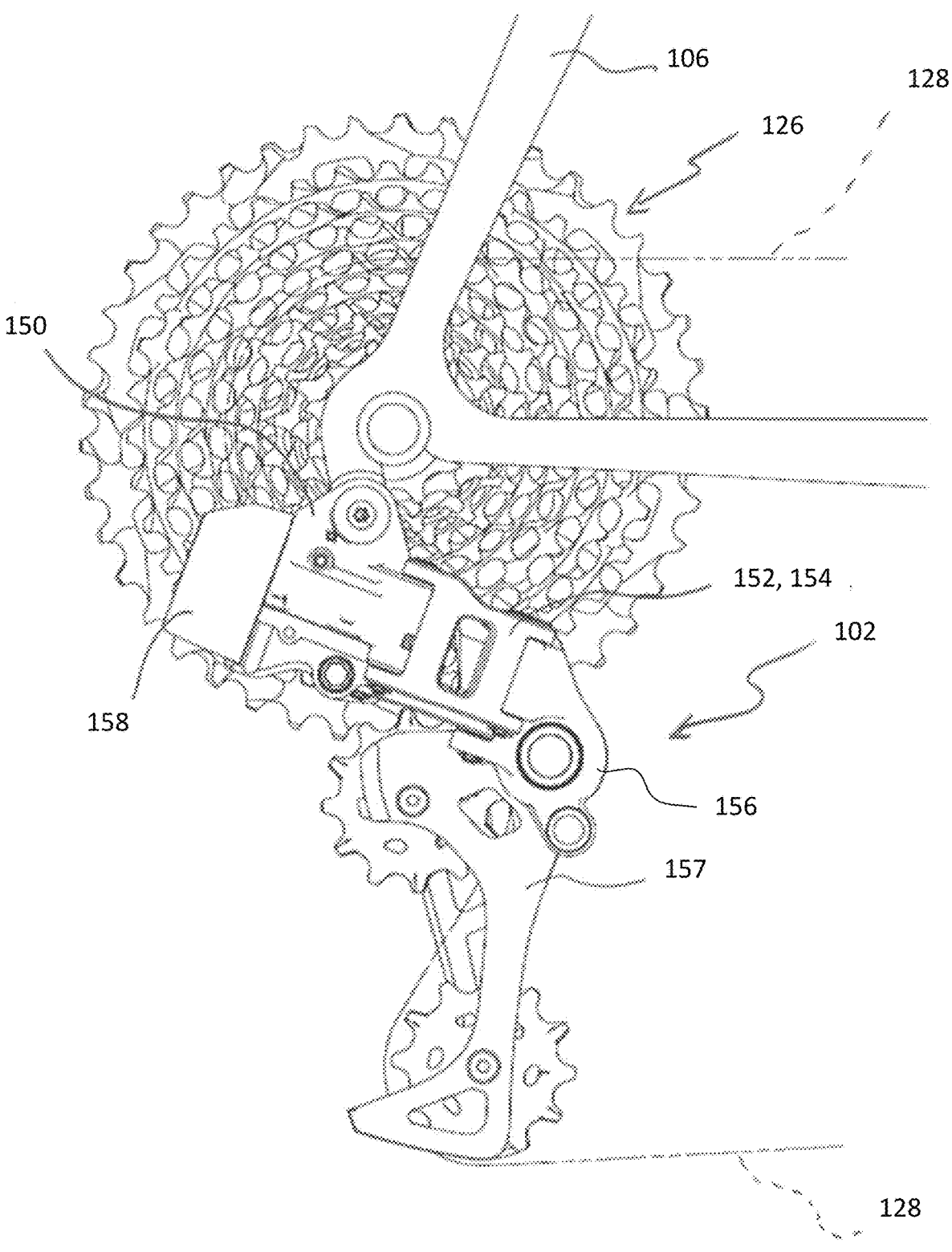
FIG. 2 is a side view of one example of a rear derailleur.

Referring to FIG. 2, the rear derailleur 102 is attached to the bicycle frame 106 and positioned next to the rear cassette 126. The chain 128 is only schematically shown in dashed lines. The electric, or electromechanical, rear derailleur 102 includes a base member 150 (e.g., a "b-knuckle"), an outer link 152, and an inner link 154. The base member 150 is attachable to the bicycle frame 106 in a conventional manner. The inner link 154 is pivotally attached to the base member 150 by link pins, for example. A moveable member or assembly 156 (e.g., a "p-knuckle") is pivotally connected to the outer link 152 and the inner link 154 at an end opposite the base member 150 to permit displacement of the moveable assembly 156 relative to the base member 150.

The rear derailleur 102 may also be configured to work with an integrated power source 158, such as a removable battery. In the examples shown in FIGS. 1 and 2, the integrated power source or battery 158 is attached to the rear derailleur 102. The integrated power source 158 may power, for example, a motor of the rear derailleur 102 used to shift the rear derailleur 102.

As shown in FIG. 1, the bicycle 100 also has a handlebar mounted user interface, by way of the shift actuator or electric actuator 148. All of the electric components discussed above and/or other electric components may be connected to the remote power source or remote battery 142.

Additionally, all communication between an e-bike central control system or controller, and each of these electric components is achieved through wired or wireless communication. There may be discrete control with individual wires from the central controller to each component, or the system may use a controller area network ("CAN") bus designed to allow microcontrollers and devices to communicate with each other in applications.

While the illustrated bicycle 100 is a mountain bicycle and may include suspension components, such as a shock absorbing front fork, the embodiments disclosed herein may be implemented with other types of bicycles such as, for example, road bicycles. The front and/or forward orientation of the bicycle 100 is indicated by the direction of the arrow "A" in FIG. 1. As such, a forward direction of movement of the bicycle is indicated by the direction of the arrow A.

An e-bike central control system or controller (e.g., a motor controller) may be supported by a same housing as the remote power source 142. The e-bike controller may control power from the remote power source 142 to components on the bicycle 100 such as, for example, the power assist device 140. The e-bike controller may control power to other and/or different components on the bicycle 100. The e-bike controller may send signals (e.g., instructions) to and/or receive data (e.g., instructions and/or sensor data) from components on the bicycle 100 such as, for example, the derailleur 102, a suspension system, and/or a seat post assembly to actuate and/or control components of the bicycle 100.

In other embodiments, the e-bike controller may be located in other locations (e.g., mounted on the handlebars) on the bicycle 100 or, alternatively, may be distributed among various components of the bicycle 100, with routing of a communication link to accommodate necessary signal and power paths. The e-bike controller may also be located other than on the bicycle 100, such as, for example, on a rider's wrist or in a jersey pocket. The communication link may include wires, may be wireless, or may be a combination thereof. In one example, the e-bike controller may be integrated with the rear derailleur 102 to communicate control commands between components. The e-bike controller may include, for example, a processor, a communication device (e.g., a wireless communication device), a memory, and one or more communication interfaces.

In one example, the controller of the derailleur and/or the e-bike controller wirelessly actuates a motor module of the derailleur 102 and/or an assist motor and operates the derailleur 102 for executing gear changes and gear selection. Additionally or alternatively, the controller of the derailleur and/or the e-bike controller may be configured to control gear shifting of a front gear changer.

The bicycle 100 may include one or more sensors. For example, the one or more sensors include a wheel speed sensor 160 that is configured to determine a wheel speed based on sensing a sensing element 162 (e.g., a magnet) positioned on, for example, the rear wheel 114 of the bicycle 100. The one or more sensors may also include, for example, an input power sensor 163 at, for example, a crank shaft of the crank assembly 124 of the electric bicycle 100, and an output power sensor 164 at, for example, a hub of the rear wheel 114.

Figure 3:
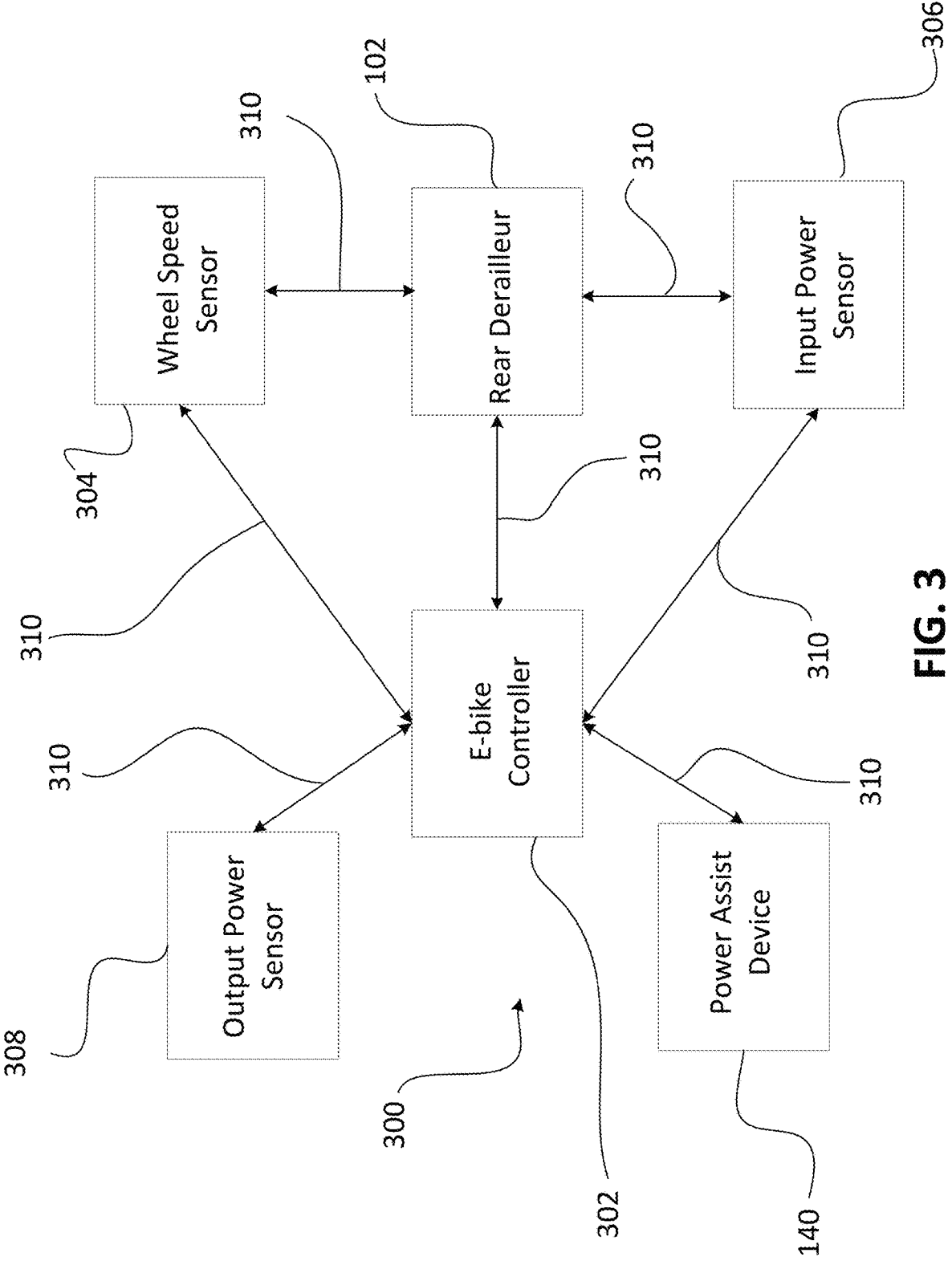
FIG. 3 is a block diagram of an example of an electro-mechanical control system.

FIG. 3 shows an example of a control system 300 (e.g., an electromechanical control system) for the bicycle 100, for example. The control system 300 includes an e-bike controller 302 (e.g., a motor controller), the power assist device 140, the rear derailleur 102, and one or more sensors. The power assist device 140 is, for example, an assist motor.

The one or more sensors include, for example, a wheel speed sensor 304, an input power sensor 306, and an output power sensor 308. For example, the wheel speed sensor 304 measures a rotational speed of at least one of the wheels 114, 112, the input power sensor 306 measures input torque and cadence at the crank shaft of the crank assembly 124, and the output power sensor 308 measures output torque and angular velocity at, for example, the rear wheel 114. In one embodiment, the one or more sensors may include at least two wheel speed sensors 306, one for the front wheel 112 and one for the rear wheel 114.

The wheel speed sensor 304, the input power sensor 306, and the output power sensor 308 may be any number of different types of sensors. For example, the wheel speed sensor 304 may be a combined speed and cadence sensor. The speed and cadence sensor may include a spoke magnet attached to a spoke of the front wheel 112 or the rear wheel 114 and/or a cadence magnet attached to one of the crank arms 130, and a sensor attached to the frame 106 of the bicycle 100 (e.g., a Hall effect sensor). The sensor attached to the frame 106 of the bicycle is configured to identify and count rotations of the one crank arm 130 and/or the front wheel 112 or the rear wheel 114 based on the cadence magnet and/or the spoke magnet passing the sensor attached to the frame 106, respectively. The input power sensor 306 and the output power sensor 308 may include, for example, power meters.

The control system 300 may include more, fewer, and/or different sensors. For example, the one or more sensors may include a torque sensor that measures a torque on the crank assembly 124 and/or a torque on an output shaft of the assist motor 141. Any number of different types of torque sensors may be provided. For example, the torque sensor may include magnetoelastic torque sensors, strain gauges, SAW devices, and/or other types of torque sensors. In one embodiment, the torque sensor is a current sensor that measures current through the assist motor 141. The amount of current consumed by the assist motor 141 is proportional to a torque the assist motor 141 applies to a drivetrain of the bicycle 100.

As shown in the embodiment of FIG. 3, the power assist device 140, the rear derailleur 102, and the one or more sensors (e.g., the wheel speed sensor 304, the input power sensor 306, and the output power sensor 308) may be in direct communication with the e-bike controller 302. Alternatively or additionally, at least some components of the control system 300 may be in indirect communication with the e-bike controller 302. For example, the wheel speed sensor 304, the input power sensor 306, and/or the output power sensor 308 may be in direct communication with the rear derailleur 102 and indirect communication with the with the e-bike controller 302 via the rear derailleur 102. In one embodiment, each of at least the rear derailleur 102 and the e-bike controller 302 is in direct communication with all sensors of, for example, the wheel speed sensor 304, the input power sensor 306, and the output power sensor 308. Other and/or different components of the control system 300 may be in direct communication with all sensors of the one or more sensors (e.g., the power assist device 140). Communication between the components of the control system 300 may be wired communication and/or wireless communication.

Each communication link 310 between the components of the control system 300 may be in both directions. In other words, data flow between components of the control system 300 in direct communication may be in both directions. For example, the wheel speed sensor 304 may receive signals from the e-bike controller 302 or the rear derailleur 102 (e.g., as to when to measure the rotational speed) and return the measured rotational speed to the e-bike controller 302 or the rear derailleur 102.

Figure 4:
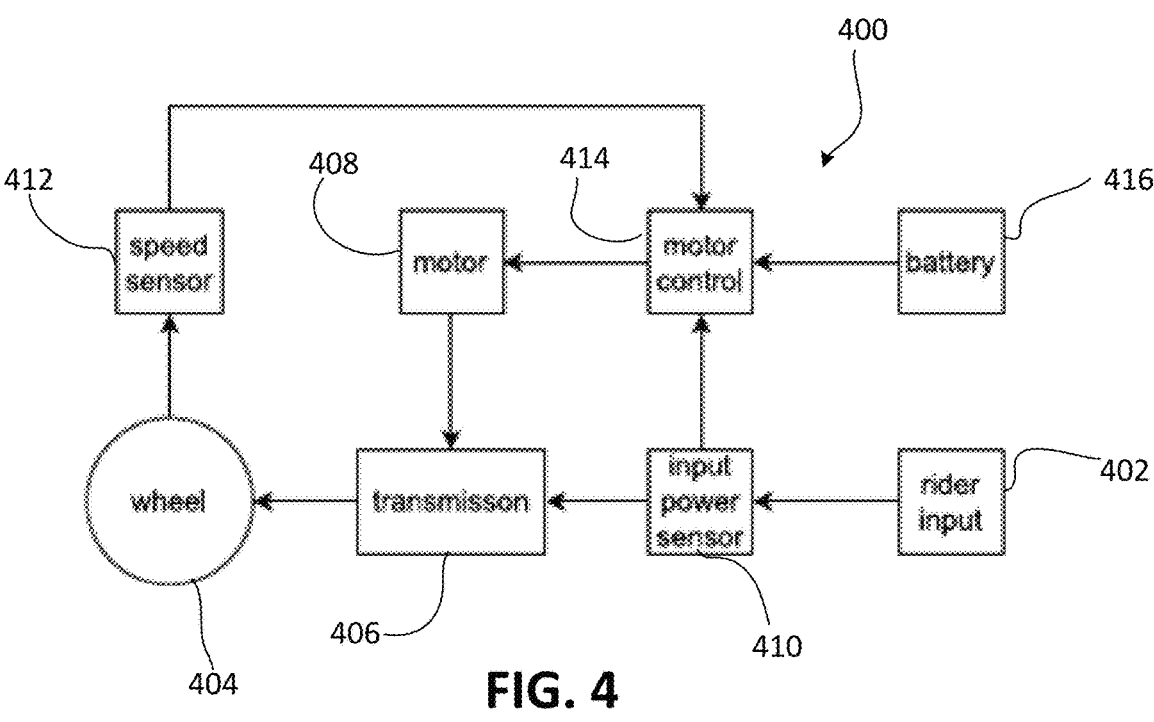
FIG. 4 is a block diagram of an example of an electric bicycle.

FIG. 4 is a block diagram of an example of an electric bicycle 400. A rider pedals the electric bicycle 400 at a rider input 402. The rider input 402 includes a crank arm assembly (e.g., the crank arm assembly 124 of FIG. 1). The crank arm assembly includes a crank arm (e.g., the crank arm 130 of FIG. 1) and pedals rotatably connected to the crank arm (e.g., the pedals 132 of FIG. 1). At the rider input 402, the rider pedals the electric bicycle 400 in the typical manner (e.g., via the pedals of the rider input 402).

The pedals of the rider input 402 drive a wheel 404 (e.g., the rear wheel 114 of FIG. 1) through a transmission 406. The transmission 406 may include any number of gears to provide a desirable cadence for various speeds and conditions for the electric bicycle 400. In one example, the transmission 406 is a multi-gear transmission 406 that includes, one or more external gears (e.g., a chain, derailleur (s), multiple coaxial sprockets), one or more internally geared rear hubs, one or more spur-gear clusters within a drive unit (e.g., the power assist device 140 of FIG. 1), one or more continuously variable (CV) transmissions, one or more virtual electronic transmissions, or any combination thereof.

The electric bicycle 400 also includes a motor 408 (e.g., the power assist motor 141 of FIG. 1). The motor 408 drives the wheel 404 through the transmission 406. The motor 408 may include a gear reduction to allow the motor 408 to provide additional torque to the transmission 406 or the wheel 404. The motor 408 may be any number of different types of motors including, for example, a brushless direct current (DC) mid-drive motor. The motor 408 may be, for example, a 250 Watt motor, a 350 Watt motor, or a 500 Watt motor. Other types of motors may be used for the motor 408.

The electric bicycle 400 also includes an input power sensor 410. The input power sensor 410 may be configured to determine, for example, an input cadence and an input torque from the rider, where the input power is equal to the input cadence multiplied by the input torque. The input power sensor 410 may include any number of different types of sensors including, for example, a power meter, a strain gauge, and/or a cadence sensor. The input power sensor 410 may be located at any number of different locations of the electric bicycle 400 including, for example, a pedal axle, a pedal body, a crank shaft, and/or a crank arm of the electric bicycle 400. In other embodiments, different types of input power sensors 410 may be used, and/or the input power sensor 410 may be located in other locations of the electric bicycle 400.

The electric bicycle 400 also includes a speed sensor 412. The speed sensor 412 is configured to measure a speed of the electric bicycle 400. The speed sensor 412 may include any number of different types of sensors including, for example, rotational wheel speed sensors, global positioning system (GPS) sensors, and/or accelerometer-based speed sensors. The speed sensor 412 may be located at any number of different locations of the electric bicycle 400 including, for example, the wheel 404, a fork (e.g., a rear fork and/or a front fork), and/or a crank shaft of the electric bicycle 400. In other embodiments, different types of speed sensors 412 may be used, and/or the speed sensor 412 may be located in other locations of the electric bicycle 400.

The electric bicycle 400 also includes a controller 414 (e.g., a motor controller). The controller 414 may include any number of components. For example, the controller 414 includes one or more processors and a memory. The controller 414 may be part of the motor 408 or be separate from the motor 408 and configured to control the motor 408 via wired connections and/or wirelessly.

The motor controller 414 is in communication with the input power sensor 410 and the speed sensor 412 (e.g., via wired connections and/or wirelessly). The motor controller 414 is configured to receive bicycle speed data from the speed sensor 412 and rider input power data from the input power sensor 410. The motor controller 414 is, for example, configured to control the motor 408 based on the bicycle speed data received from the speed sensor 412 and the rider input power data received from the input power sensor 410. The motor controller 414 is configured to assist the rider in propelling the electric bicycle 400 by adding power, with the motor 408, to drive the wheel 404 of the electric bicycle 400.

The motor controller 414 may be powered by (e.g., receive electrical power from) a battery 416. The battery 416 may be a dedicated battery for the motor controller 414. In one embodiment, the battery 416 is a battery for another component of the electric bicycle 400 (e.g., the motor 408 or a derailleur of the electric bicycle 400) and powers the motor controller 414 in addition to at least the other component of the electric bicycle 400.

Figure 5:
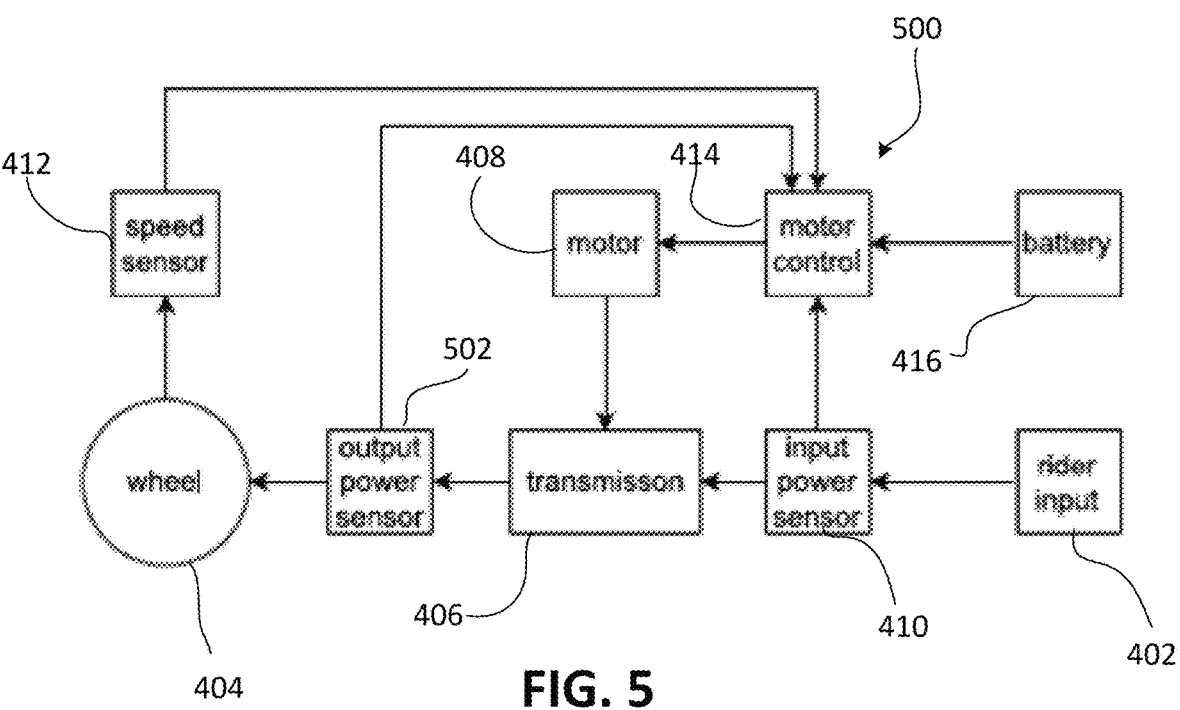
FIG. 5 is a block diagram of another example of an electric bicycle.

FIG. 5 is a block diagram of another example of an electric bicycle 500. In addition to the components of the electric bicycle 400 of FIG. 4, the electric bicycle 500 of FIG. 5 also includes an output power sensor 502. The output power sensor 502 may be configured to determine, for example, an output power of the electric bicycle 500. The output power sensor 502 may include any number of different types of sensors including, for example, a power meter, a strain gauge, and/or a cadence sensor. The output power sensor 502 may be located at any number of different locations of the electric bicycle 500 including, for example, an output of the transmission 406, within a hub of the wheel 404, and/or on a frame of the electric bicycle 500. In other embodiments, different types of output power sensors 502 may be used, and/or the output power sensor 502 may be located in other locations of the electric bicycle 500.

The motor controller 414 may also be in communication (e.g., via wired connection and/or wirelessly) with the output power sensor 502. The motor controller 414 is configured to receive output power data from the output power sensor 502. The motor controller 414 is, for example, configured to control the motor 408 based on the bicycle speed data received from the speed sensor 412, the rider input power data received from the input power sensor 410, and the rider output power data received from the output power sensor 502. The motor controller 414 is configured to assist the rider in propelling the electric bicycle 400 by adding power to drive the wheel 404 of the electric bicycle 500.

Figure 6:
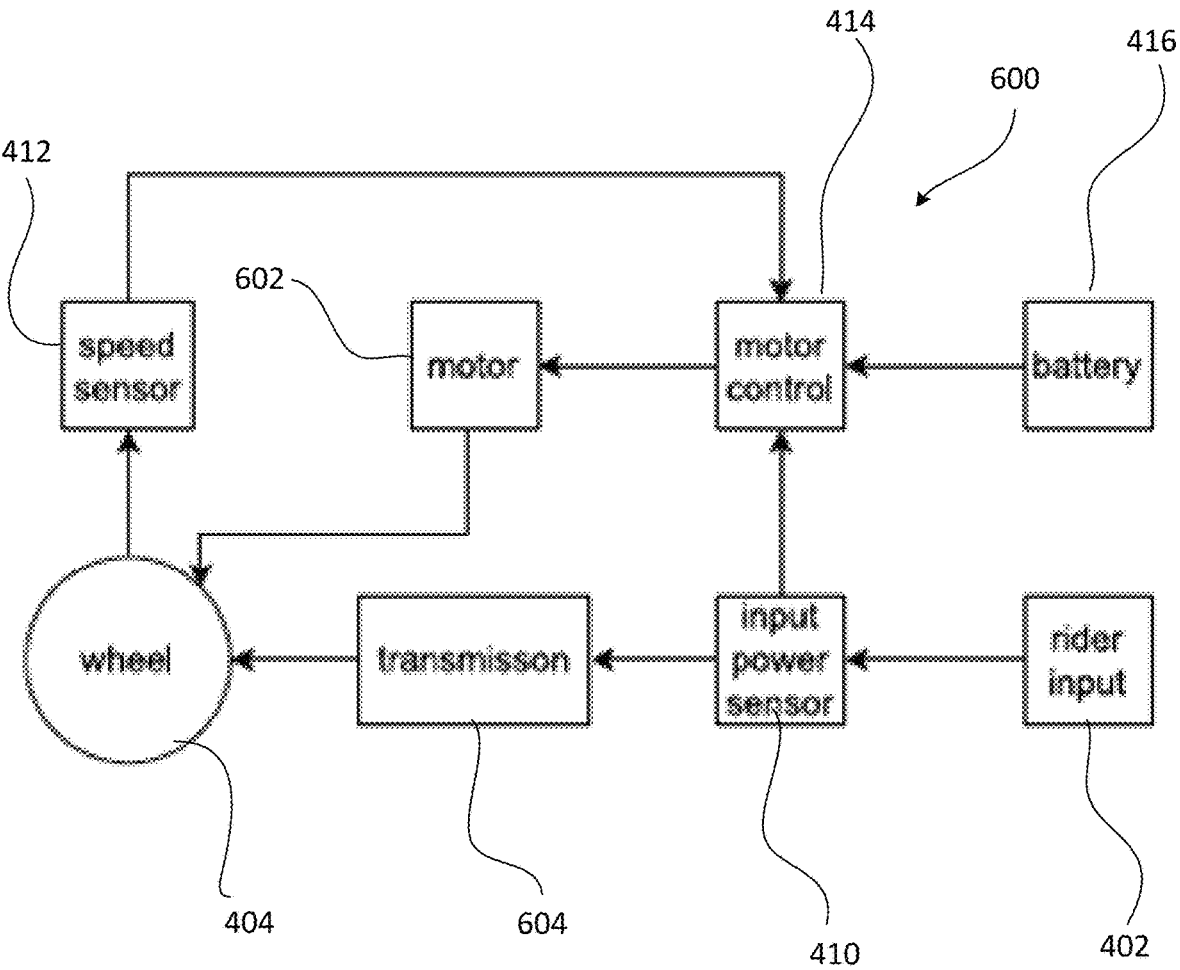
FIG. 6 is a block diagram of yet another example of an electric bicycle.

FIG. 6 is a block diagram of yet another example of an electric bicycle 600. A motor 602 is configured to drive the wheel 404 directly instead of via a transmission (e.g., as shown in the example of FIG. 4). A transmission 604 of the electric bicycle 600 may be different than the transmission 406 of the electric bicycle 400 and the electric bicycle 500, respectively. For example, the transmission 604 of the electric bicycle 600 may include more, fewer, and/or different gears. For example, the transmission 604 may include: more, fewer, and/or different external gears; more, fewer, and/or different internally geared rear hubs; more, fewer, and/or different spur-gear clusters within a drive unit; more, fewer, and/or different continuously variable (CV) transmissions; and/or more, fewer, and/or different virtual electronic transmissions. In an embodiment, the motor 602 may alternatively be configured to drive a front wheel directly in a similar manner as described with respect to the wheel 404.

Figure 7:
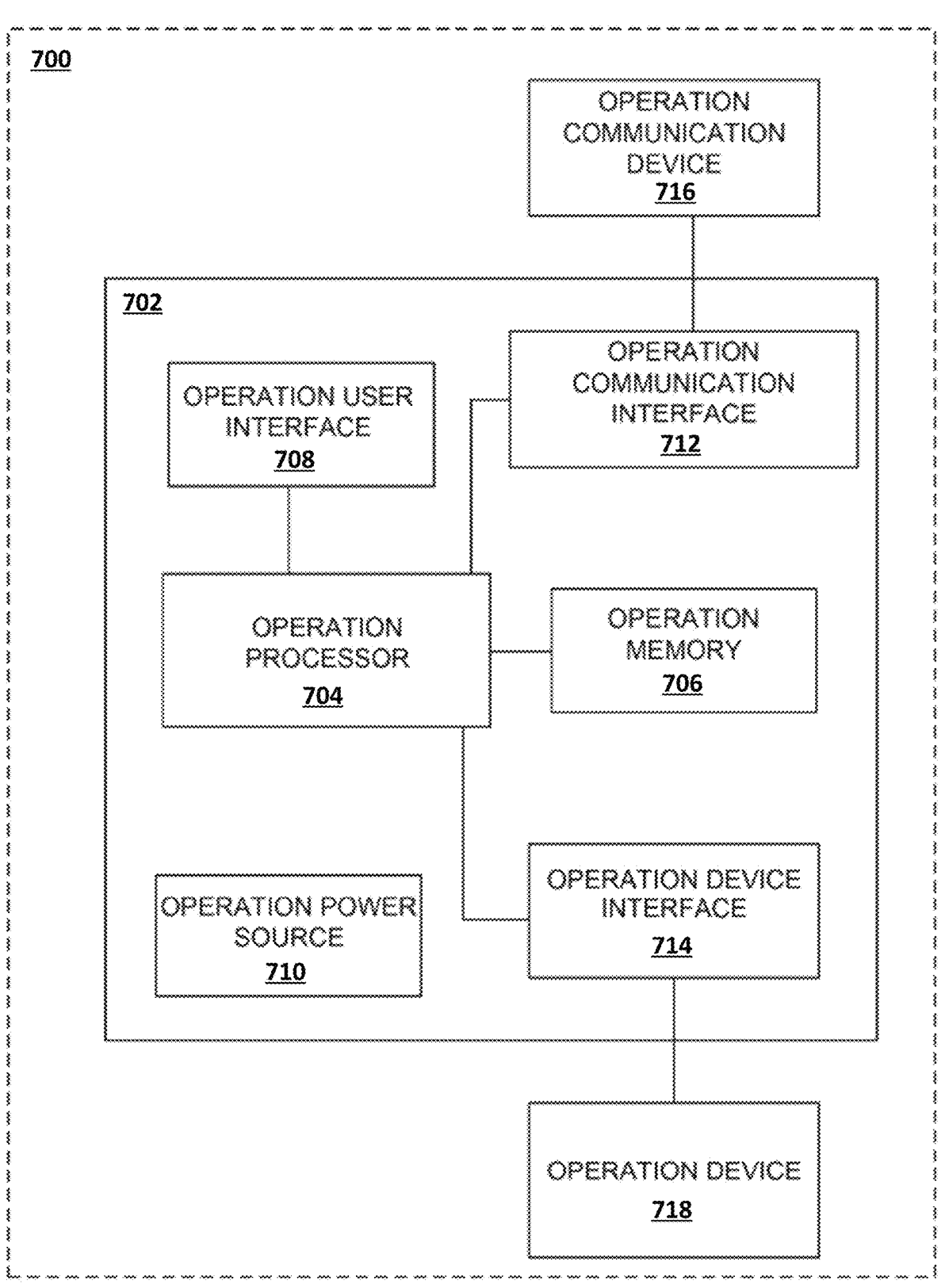
FIG. 7 is a block diagram of an example of an operation component.

FIG. 7 is a block diagram of an operation component 700. The operation component 700 may be or may be part of one or more of the previously described components such as, for example, the e-bike controller 302, the motor controller 414, or the motor 408. The operation component 700 may also be another component, such as the power assist device 140 or an internal gearbox component. A plurality of operation components 700 may be provided.

The operation component 700 is provided with an operation unit 702, which may be a circuit board or an alternative configuration. The operation unit 702 includes an operation processor 704, an operation memory 706, an operation user interface 708, an operation power source 710, an operation communication interface 712, and an operation device interface 714. In an embodiment, the operation communication interface 712 is in communication with an operation communication device 716, and the operation device interface 714 is in communication with an operation device 718. Additional, different, or fewer components may be provided. For example, the operation user interface 708 may be omitted.

The structure, connections, and functions of the operation processor 704 may be representative of those of the rear derailleur 102, the front derailleur, the e-bike controller 302, the motor controller 414, or another component. The operation processor 704 may include a general processor, digital signal processor, an ASIC, FPGA, analog circuit, digital circuit, combinations thereof, or other now known or later developed processor. The operation processor 704 may be a single device or combinations of devices, such as through shared or parallel processing.

The operation memory 706 may be a volatile memory or a non-volatile memory. The operation memory 706 may include one or more of a ROM, a RAM, a flash memory, an EEPROM, or other type of memory. The operation memory 706 may be removable from the operation component 700, such as an SD memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 706 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding, or carrying a set of instructions for execution by a processor or that cause a computer system to perform any one or more of the methods or operations disclosed herein.

The operation power source 710 is a portable power source, which may be stored internal to the operation component 700 or stored external to the operation component 700 and communicated to the operation component through a power conductive cable. The operation power source 710 may involve the generation of electric power, for example using a mechanical power generator, a fuel cell device, photo-voltaic cells, piezoelectric, or other power-generating devices. The operation power source 710 may include a battery such as a device consisting of two or more electrochemical cells that convert stored chemical energy into electrical energy. The operation power source 710 may include a combination of multiple batteries or other power providing devices. Specially fitted or configured battery types, or standard battery types may be used.

In the example where the operation component 700 is the motor controller 414, the operation power source 710 may be stored external to the operational component 700. In the example where the operation component 700 is the e-bike controller 302 or the motor 408, the operation power source 710 may be stored internal or external to the operation component 700. For example, the e-bike controller 302 may be supported within a housing of the remote power source 142 of FIG. 1.

The operation device interface 714 provides for operation of a component of the bicycle 100. For example, the operation device interface 714 may transmit power from the operation power source 710 to generate movement in the operation device 718. In various embodiments, the operation device interface 714 sends power to control movement of the assist motor 141, a motor of the rear derailleur 102, a motor of the front derailleur, or any combination thereof. In one embodiment, the operation component 700 is the e-bike controller 302 or the motor controller 414, and the operation device interface 714 sends power to control movement of the power assist device 140. The operation device interface 714 includes wired conductive signals and/or data communication circuitry operable to control the operation device 718.

The operation user interface 708 may be one or more buttons, keypad, keyboard, mouse, stylus pen, trackball, rocker switch, touch pad, voice recognition circuit, or other device or component for communicating data between a user and the operation component 700. The operation user interface 708 may be a touch screen that may be capacitive or resistive. The operation user interface 708 may include an LCD panel, LED, LED screen, TFT screen, or another type of display. The operation user interface 708 may also include audio capabilities or speakers.

The operation communication interface 712 is configured to receive, with the operation communication device 716, data such as measurement data (e.g., input power, output power, rotational crank speed, rotational wheel speed, bicycle speed, and/or torque), anticipation signals, operation signals, and/or other signals from bicycle components (e.g., the wheel speed sensor 304, the input power sensor 306, the output power sensor 308, and/or the e-bike controller 302).

In one embodiment, the operation component 700 includes more than one operation communication interface 712 in communication with more than one operation communication device 716, respectively. The operation communication interface 712 may also be configured to send data such as status signals (e.g., input power sensor signals) for reception by, for example, the e-bike controller 302. The operation communication interface 712 communicates the data using any operable connection. An operable connection may be one in which signals, physical communications, and/or logical communications may be sent and/or received. An operable connection may include a physical interface, an electrical interface, and/or a data interface. One or more operation communication interfaces may provide for wireless communications through the operation communication device 716 in any now known or later developed format.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as components of the control system 300 (e.g., the motor controller 414, the e-bike controller 302, and the rear derailleur 102), and/or other components on the bicycle 100 and/or worn by the user. Further, in an exemplary, non-limiting embodiment, implementations may include distributed processing, component/object distributed processing, and parallel processing. Alternatively, virtual computer system processing can be constructed to implement one or more of the methods or functionalities as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media, and memory devices, including by way of example: semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The operation communication device 716 provides for data and/or signal communication from the operation component 700 to another component of the bicycle 100, or an external device such as a mobile phone or other computing device. The operation communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The operation component 700 may include an antenna with circuitry of a PCB of the operation component 700; however, additional antennae may also be included in the circuitry. The control antenna may be integrated with another component of the bicycle 100 or may be an independent component. For example, the control antenna may be integrated as part of the motor controller 414, the e-bike controller 302, and/or as part of the rear derailleur 102.

The motor controller 414, for example, may allow configuration of a number of ride modes that may be switched between by a control unit (e.g., the e-bike controller 302 or another controller on or outside of the bicycle 100). The control unit may switch the ride mode based on user input (e.g., via the electric actuator 148 or another interface) or automatically based on sensed conditions. In each mode, various characteristics of the ride mode may be adjusted. For example, gear hysteresis, minimum gear to shift to without pedaling, and/or other characteristics may be adjusted.

Various regional regulations limit motor assistance above a pre-determined bicycle speed (e.g., a predetermined maximum threshold speed). Electric bicycles often include multiple support levels that may be selected by the rider. The rider selectable support levels may include, for example: Eco mode (40% support); Tour mode (100% support); Sport mode (170% support); and Turbo mode (250% support). If a rider selects "Tour mode," for example, and is riding below the predetermined maximum threshold speed and inputting 100 Watts to the pedals of the electric bicycle, the assist motor of the electric bicycle will provide 100 additional Watts to a wheel (e.g., the rear wheel) of the electric bicycle.

Transmissions of electric bicycles provide a plurality of gear ratios to the rider to provide a comfortable pedaling cadence for varying riding conditions and speeds. These transmissions have losses that may range from 1% to 15% or more. When riding at or above the predetermined maximum threshold speed, transmission losses are determined, and the motor is instructed to provide mechanical drive power to a wheel (e.g., a rear wheel) that is less than or equal to the determined transmission losses.

Figure 8:
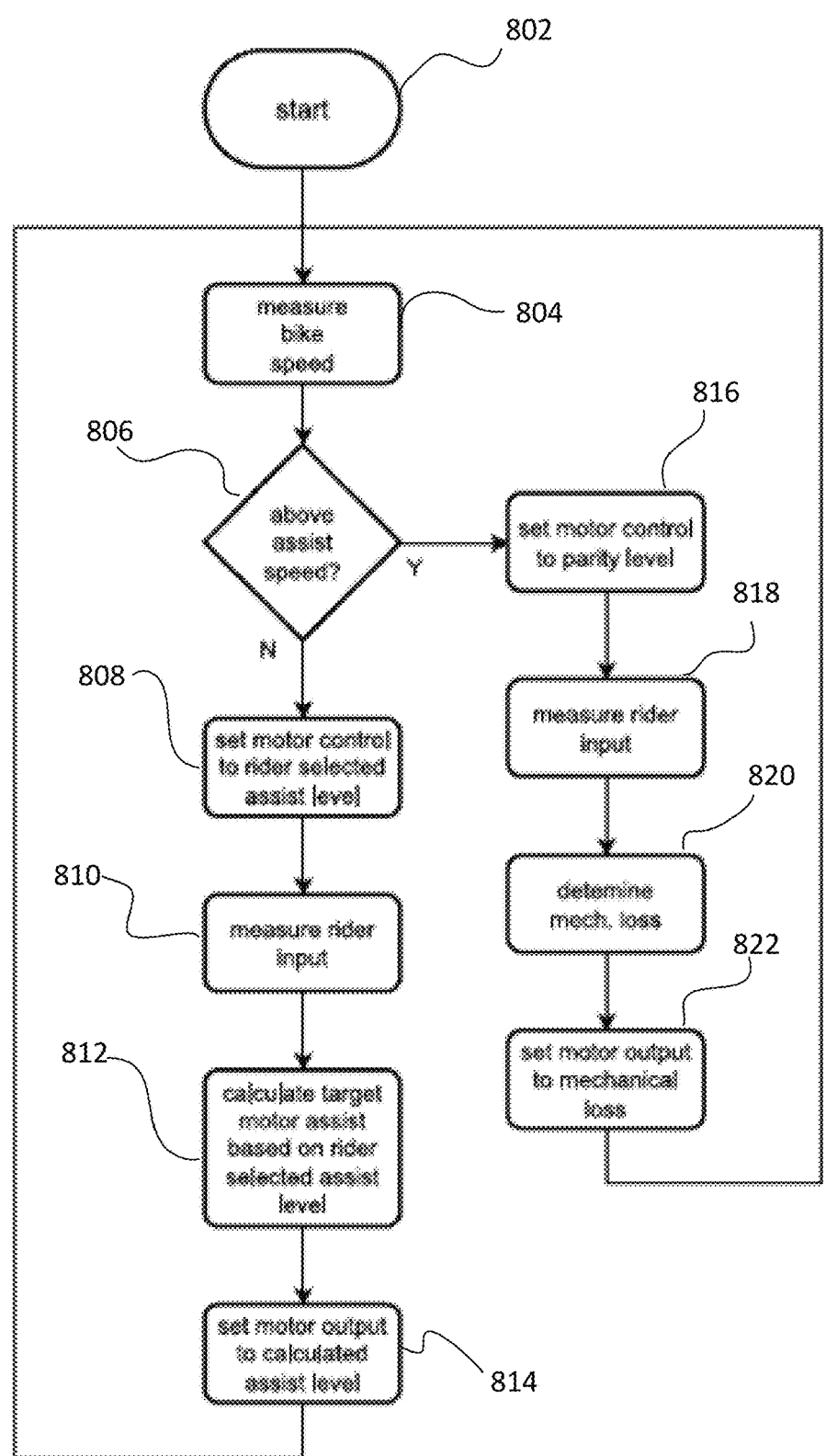
FIG. 8 is a flowchart of an embodiment of a method for compensating for transmission losses of an electric bicycle.

FIG. 8 is a flowchart of an embodiment of a method 800 for compensating for transmission losses of an electric bicycle (e.g., the bicycle 100). The flowchart also illustrates a method for transmitting and receiving wireless signals on the bicycle. As presented in the following sections, the acts may be performed using any combination of the components indicated in previous figures. For example, the following acts may be performed by at least some components of the control system 300, as well as additional or other components. In an embodiment, the acts may be performed by, for example, the e-bike controller 302, the motor controller 414, the power assist device 140, the one or more sensors, or any combination thereof. Additional, different, or fewer acts may be provided. The acts are performed in the order shown or in other orders. The acts may be repeated.

In act 802, the method 800 is started. The method 800 may start when a controller of an electric bicycle (e.g., the motor controller 414) is turned on. For example, the controller of the bicycle may wake when the electric bicycle is moved. The controller or another component of the electric bicycle may include, for example, an accelerometer, and the accelerometer may sense when the electric bicycle is moved. The controller of the electric bicycle may be in communication with the accelerometer, and the controller may receive acceleration data from the accelerometer indicating the electric bicycle has been moved. The controller may wake in response to the received acceleration data and start the method 800 in act 802.

In one embodiment, in act 802, a rider may start the method 800 at an interface of the electric bicycle. For example, the rider may interact (e.g., press, or press and hold) an electric actuator (e.g., the electric actuator 148 of FIG. 1) of the electric bicycle to start the method 800 is act 802.

In act 804, the controller (e.g., a processor of the controller) determines a speed of the electric bicycle. The electric bicycle includes, for example, a speed sensor that is in communication with, for example, the processor of the controller (e.g., via one or more wired connections and/or wirelessly). The speed sensor generates and transmits speed data that corresponds to the electric bicycle to the processor, and the processor determines the speed of the electric bicycle based on the received speed data. The speed sensor may include any number of different types of sensors including, for example, one or more rotational wheel speed sensors, one or more GPS sensors, one or more accelerometer-based speed sensors, one or more other types of speed sensors, or any combination thereof.

In act 806, the processor determines whether the speed of the electric bicycle determined in act 804 is greater than a predetermined maximum threshold speed. The predetermined maximum threshold speed may be set based on local and/or Federal law. For example, an electric bicycle may be required by law to not provide motor assistance to a rider if the electric bicycle is traveling above 25 km/h. Other predetermined maximum threshold speeds may be provided.

The predetermined maximum threshold speed may be stored in a memory of the controller, another memory of the electric bicycle, and/or a memory off the electric bicycle (e.g., a memory of a mobile computing device). The predetermined maximum threshold speed may be stored in the memory of the controller, for example, when the electric bicycle is manufactured or after the electric bicycle is manufactured. For example, the predetermined maximum threshold speed may be user defined.

The processor may identify the predetermined maximum threshold speed from the memory and compare the speed of the electric bicycle determined in act 804 to the predetermined maximum threshold speed. When, based on the comparison, the speed of the electric bicycle determined in act 804 is less than the predetermined maximum threshold speed, the method 800 moves to act 808. When, based on the comparison, the speed of the electric bicycle determined in act 804 is greater than the predetermined maximum threshold speed, the method 800 moves to act 816.

In act 808, the processor determines an assist level to be provided by an assist motor (e.g., the assist motor 141) of the electric bicycle. In one embodiment, the assist level to be provided by the assist motor is user (e.g., rider) selected. For example, the rider interacts with an input device (e.g., the electric actuator 148) of the electric bicycle to select the assist level to be provided by the assist motor, and the processor determines the assist level to be provided by the assist motor based on the rider interaction with the input device. Different button presses, sequences of button presses, button holds, lever pulls, or other user inputs at the bicycle may correspond to different levels of assistance to be provided by the assist motor.

The rider selectable support levels may include, for example: Eco mode (e.g., 40% support); Tour mode (e.g., 100% support); Sport mode (e.g., 170% support); and Turbo mode (e.g., 250% support). The rider selectable support levels may include, more, fewer, and/or different support levels. For example, Eco mode may correspond to a single button press of a button on the electric bicycle within a predetermined time period (e.g., 3 seconds). Tour mode may correspond to two button presses of the button within the predetermined time period. Sport mode may correspond to three button presses of the button within the predetermined time period. Turbo mode may correspond to four button presses of the button within the predetermined time period. Other inputs corresponding to the different modes, respectively, may be provided.

In act 810, the processor determines a rider input power. For example, the electric bicycle includes an input power sensor, and the processor determines the rider input power based on data generated by and received from the input power sensor. The input power sensor may be configured to determine, for example, an input cadence and an input torque from the rider, where the input power is equal to the input cadence multiplied by the input torque. The input power sensor may include any number of different types of sensors including, for example, a power meter, a strain gauge, and/or a cadence sensor. The input power sensor may be located at any number of different locations of the electric bicycle including, for example, a pedal axle, a pedal body, a crank shaft, and/or a crank arm of the electric bicycle. In other embodiments, different types of input power sensors may be used, and/or the input power sensor may be located at other locations of the electric bicycle.

In act 812, the processor determines a target motor assist to be provided by the assist motor of the electric bicycle based on the assist level determined in act 808. For example, the assist level may be a percentage (e.g., Eco mode, 40% support; Tour mode, 100% support; Sport mode, 170% support; and Turbo mode, 250% support) of the rider input power determined in act 810, and the processor may calculate the target motor assist by multiplying the assist level determined in act 808 and the rider input power determined in act 810. For example, if the rider selects "Tour mode" in act 808, is riding below the predetermined maximum threshold speed, as determined in act 806, and is inputting 100 Watts to the pedals of the electric bicycle, as determined in act 810, the processor determines the target motor assist to be 100 additional Watts. In another example, if the rider selects "Eco mode" in act 808, is riding below the predetermined maximum threshold speed, as determined in act 806, and is inputting 100 Watts to the pedals of the electric bicycle, the processor determines the target motor assist to be 40 additional Watts. Other assist levels may be selected and/or provided.

In one embodiment, the assist level may be a predetermined power that corresponds to the target motor assist to be provided by the assist motor. In other words, the target motor assist to be provided by the assist motor is not based on the rider input power determined in act 810.

In act 814, the processor controls the assist motor based on the calculated target motor assist to be provided by the assist motor of the electric bicycle, determined in act 812. For example, the processor may control a current provided to the assist motor by a battery of the bicycle based on the target motor assist determined in act 812.

After act 814, the method 800 returns to act 804, and the method 800 is repeated. In one embodiment, the method 800 is repeated at a predetermined interval. For example, the method 800 may be repeated every 0.01 ms, 0.1 ms, 1.0 ms, 2.0 ms, 5.0 ms, or another amount of time. In another embodiment, the method 800 is performed continuously without delay between repetitions.

In act 816, the processor sets the assist level to be provided by the assist motor of the electric bicycle to an amount that offsets losses within, for example, a drive train of the electric bicycle (e.g., a parity level). In this mode, the power applied to the rear wheel of the electric bicycle may be equal to or less than the power input by the rider.

In act 818, the processor determines the rider input power. For example, the electric bicycle includes an input power sensor, and the processor determines the rider input power based on data (e.g., a signal) generated by and received from the input power sensor. The input power sensor may be configured to determine, for example, an input cadence and an input torque from the rider, where the input power is equal to the input cadence multiplied by the input torque. The input power sensor may include any number of different types of sensors including, for example, a power meter, a strain gauge, and/or a cadence sensor. The input power sensor may be located at any number of different locations of the electric bicycle including, for example, a pedal axle, a pedal body, a crank shaft, and/or a crank arm of the electric bicycle. In other embodiments, different types of input power sensors may be used, and/or the input power sensor may be located at other locations of the electric bicycle.

In act 820, the processor determines mechanical losses (e.g., transmission losses) within the electric bicycle. The electric bicycle may include a transmission to provide a number of gear ratios to the rider, and thus provide a comfortable pedaling cadence for varying riding conditions and speeds. These transmissions may have losses that may range from 1% to 15% or more.

In one embodiment, the processor determines the transmission losses directly by comparing a signal received from an output power sensor to a signal received from the input power sensor in act 818. The output power sensor may include any number of different types of sensors including, for example, a power meter, a strain gauge, and/or a cadence sensor. The output power sensor may be located at any number of different locations of the electric bicycle including, for example, an output of the transmission, within a hub of the wheel, and/or on a frame of the electric bicycle. Other types of output power sensors may be used, and/or the output power sensor may be located in other locations of the electric bicycle. The processor may determine an output power of the electric bicycle based on data (e.g., the signal) generated by and received from the output power sensor.

The processor may compare the signal from the output power sensor to the signal from the input power sensor by calculating a difference between the rider input power determined in act 818 and the output power of the electric bicycle determined in act 820. The calculated difference may correspond to the transmission losses.

In another embodiment, transmission losses may be determined experimentally (e.g., in a laboratory) for a number of different operating conditions (e.g., rider input torque, cadence, bicycle speed, and/or temperature). The controller, for example, may include a memory in communication with the processor, and the transmission losses and the corresponding operating conditions may be stored in the memory (e.g., at manufacture of the electric bicycle). For example, the transmission losses and the corresponding operating conditions may be stored in the memory of the controller as a table.

The processor may identify a current operating condition. For example, the processor may identify the current operating condition based on data from one or more sensors of the electric bicycle. In one embodiment, the processor may identify the current operating condition based on the rider input power determined in act 818. Additionally or alternatively, the processor may identify the current operating condition based on bicycle speed data from a speed sensor of the electric bicycle, cadence data from a cadence sensor of the electric bicycle, temperature data from a temperature sensor of the electric bicycle, other data from one or more other sensors of the electric bicycle, or any combination thereof.

The processor may compare the identified current operating condition to the different operating conditions (e.g., corresponding to the experimentally determined transmission losses) stored in the memory. The processor may determine a closest operating condition of the stored operating conditions to the identified current operating condition based on the comparison. For example, the processor may determine differences between the identified current operating condition (e.g., a rider input torque) and the different operating conditions (e.g., rider input torques) stored in the memory. The processor may identify the stored operating condition having the determined difference that is smallest as the closest operating condition. The processor may then identify the transmission losses stored in the memory corresponding to the closest operating condition as the transmission losses within the electric bicycle in act 820.

In one embodiment, the processor may extrapolate between two closest stored operating conditions to determine the transmission losses (e.g., using the transmission losses corresponding to the two closest stored operating conditions). In one embodiment, experimental data may be curve fit, and one of the operating conditions (e.g., rider input torque) may be used as an input of a resulting function. In another embodiment, a numerical model representing the transmission of the electric bicycle may be stored at the memory of the controller, and the numerical model may output estimated transmission losses based on a current operating condition of the electric bicycle.

In act 822, the processor controls the assist motor based on the transmission losses within the electric bicycle determined in act 820. For example, the processor may control a current provided to the assist motor by a battery of the bicycle based on the transmission losses within the electric bicycle determined in act 820. For example, the processor may control the assist motor, such that the assist motor provides an output power equal to the transmission losses within the electric bicycle determined in act 820.

In one embodiment, the processor may reduce the transmission losses within the electric bicycle determined in act 820 by a predetermined margin (e.g., 5%) to provide that total power delivered to the wheel, for example, does not exceed the rider input power. For example, the processor may multiply the transmission losses within the electric bicycle determined in act 820 by a predetermined percentage (e.g., 95%), and may control the assist motor to provide an output power equal to the reduced transmission losses.

After act 822, the method 800 returns to act 804, and the method 800 is repeated. In one embodiment, the method 800 is repeated at a predetermined interval. For example, the method 800 may be repeated every 0.01 ms, 0.1 ms, 1.0 ms, 2.0 ms, 5.0 ms, or another amount of time. In another embodiment, the method 800 is performed continuously without delay between repetitions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electronic component for an electric bicycle, the electric bicycle including a transmission, the electronic component comprising:
   a processor and a sensor, the processor configured to:

identify an operating condition of the electric bicycle, the operating condition of the electric bicycle being a riding condition identified based on data output by the sensor;
   determine transmission losses of the transmission of the electric bicycle based on the identified riding condition sensed by the sensor; and
   control an assist motor of the electric bicycle based on the determined transmission losses.

2. The electronic component of claim 1, wherein the processor being configured to identify the operating condition of the electric bicycle comprises the processor being configured to identify an input torque at a crank assembly of the electric bicycle, and
   wherein the processor being configured to determine the transmission losses of the transmission of the electric bicycle based on the identified operating condition comprises the processor being configured to determine the transmission losses of the transmission of the electric bicycle based on the identified input torque at the crank assembly of the electric bicycle.

3. The electronic component of claim 2, wherein the processor being configured to identify the input torque at the crank assembly of the electric bicycle comprises the processor being configured to receive torque data from an input power sensor at the crank assembly of the electric bicycle, the torque data representing the input torque at the crank assembly.

4. The electronic component of claim 2, wherein the processor being configured to determine the transmission losses of the transmission of the electric bicycle based on the identified input torque comprises the processor being configured to:
   identify a cadence of the crank assembly of the electric bicycle;
   determine an input power based on the identified input torque and the identified cadence;
   determine an output power for the electric bicycle; and
   determine a difference between the determined input power and the determined output power, the determined difference between the determined input power and the determined output power representing the transmission losses of the transmission of the electric bicycle, and
   wherein the processor being configured to control the assist motor of the electric bicycle based on the determined transmission losses comprises the processor being configured to control the assist motor of the electric bicycle based on the determined difference.

5. The electronic component of claim 4, wherein the processor being configured to determine the output power for the electric bicycle comprises the processor being configured to receive power data from a power sensor of the electric bicycle, the power data representing the output power for the electric bicycle.

6. The electronic component of claim 1, wherein the processor is further configured to:
   identify a speed of the electric bicycle; and
   compare the identified speed of the electric bicycle to a predetermined maximum threshold speed;
   wherein the processor being configured to control the assist motor of the electric bicycle based on the determined transmission losses comprises the processor being configured to control the assist motor of the electric bicycle based on the determined transmission losses when, based on the comparison, the identified speed of the electric bicycle is greater than the predetermined maximum threshold speed.

7. The electronic component of claim 6, wherein the processor being configured to identify the speed of the electric bicycle comprises the processor being configured to receive speed data from a speed sensor of the electric bicycle, the speed data representing the speed of the electric bicycle.

8. The electronic component of claim 7, wherein the speed sensor includes a rotational wheel speed sensor, a global positioning system (GPS) sensor, an accelerometer-based speed sensor, or any combination thereof.

9. The electronic component of claim 1, further comprising a memory configured to store a plurality of predetermined transmission losses and a plurality of operating conditions corresponding to the plurality of predetermined transmission losses, respectively, and wherein the processor being configured to determine the transmission losses of the transmission of the electric bicycle based on the identified operating condition comprises the processor being configured to:

compare the identified operating condition of the electric bicycle to the plurality of operating conditions; and identify the transmission losses of the transmission of the electric bicycle from the plurality of predetermined transmission losses based on the comparison.

10. The electronic component of claim 9, wherein the plurality of operating conditions corresponding to the plurality of predetermined transmission losses includes input torque at a crank assembly of the electric bicycle, cadence of the crank assembly of the electric bicycle, speed of the electric bicycle, temperature, or any combination thereof.

11. A controller for an assist motor of an electric bicycle, the electric bicycle including a transmission, the controller comprising:

a processor configured to:

identify an input torque at a crank assembly of the electric bicycle;

identify a speed of the electric bicycle;

compare the identified speed of the electric bicycle to a predetermined maximum threshold speed;

when, based on the comparison, the identified speed of the electric bicycle is greater than the predetermined maximum threshold speed:

determine transmission losses of the transmission of the electric bicycle based on the identified input torque; and control the assist motor of the electric bicycle based on the determined transmission losses; and when, based on the comparison, the identified speed of the electric bicycle is less than the predetermined maximum threshold speed:

control the assist motor of the electric bicycle based on the identified input torque.

12. The controller of claim 11, wherein the processor is further configured to:

identify a mode for the electric bicycle, the mode being selectable by a rider; and identify a support level to be provided by the assist motor based on the identified mode, the support level being a percentage of the identified input torque to be provided as additional power by the assist motor, and wherein the processor being configured to control the assist motor of the electric bicycle based on the identified input torque comprises the processor being configured to control the assist motor of the electric bicycle based on a product of the identified input torque and the identified support level to be provided by the assist motor.

13. The controller of claim 11, wherein the processor being configured to determine the transmission losses comprises the processor being configured to:

determine an input power based on the identified input torque and a cadence of the crank assembly of the electric bicycle;

determine an output power for the electric bicycle; and determine a difference between the determined input power and the determined output power, the determined difference between the determined input power and the determined output power representing the transmission losses of the transmission of the electric bicycle, and wherein the processor being configured to control the assist motor of the electric bicycle based on the determined transmission losses comprises the processor being configured to control the assist motor of the electric bicycle based on the determined difference.

14. The controller of claim 11, further comprising a memory configured to store a plurality of predetermined transmission losses and a plurality of operating conditions corresponding to the plurality of predetermined transmission losses, respectively, and wherein the processor being configured to determine the transmission losses comprises the processor being configured to:

compare the identified input torque at the crank assembly of the electric bicycle to the plurality of operating conditions; and identify the transmission losses of the transmission of the electric bicycle from the plurality of predetermined transmission losses based on the comparison.

15. The controller of claim 11, wherein the processor being configured to identify the input torque at the crank assembly of the electric bicycle comprises the processor being configured to receive torque data from an input power sensor at the crank assembly of the electric bicycle, the torque data representing the input torque at the crank assembly, and wherein the processor being configured to identify the speed of the electric bicycle comprises the processor being configured to receive speed data from a speed sensor of the electric bicycle, the speed data representing the speed of the electric bicycle.

16. A system for controlling an electric bicycle, the electric bicycle including a transmission, the system comprising:

a first sensor configured to generate input torque data;

a second sensor configured to generate bicycle speed data;

a processor in communication with the first sensor and the second sensor, the processor being configured to:

receive the input torque data from the first sensor, the input torque data representing an input torque at a crankarm assembly of the electric bicycle;

receive the bicycle speed data from the second sensor, the bicycle speed data representing a speed of the electric bicycle;

compare the speed of the electric bicycle to a predetermined maximum threshold speed; and when, based on the comparison, the speed of the electric bicycle is greater than the predetermined maximum threshold speed:

determine transmission losses of the transmission of the electric bicycle based on the input torque; and control an assist motor of the electric bicycle based on the determined transmission losses.

17. The system of claim 16, wherein the processor is further configured to:

control the assist motor of the electric bicycle based on the input torque when, based on the comparison, the identified speed of the electric bicycle is less than the predetermined maximum threshold speed.

18. The system of claim 16, wherein the processor being configured to determine the transmission losses of the transmission of the electric bicycle based on the input torque comprises the processor being configured to:

determine an input power based on the input torque and a cadence of the crank arm assembly of the electric bicycle;

determine an output power for the electric bicycle; and determine a difference between the determined input power and the determined output power, the difference between the determined input power and the determined output power representing the transmission losses of the transmission of the electric bicycle, and wherein the processor being configured to control the assist motor of the electric bicycle based on the determined transmission losses comprises the processor being configured to control the assist motor of the electric bicycle based on the determined difference.

19. The system of claim 18, wherein the processor being configured to determine the output power for the electric bicycle comprises the processor being configured to receive power data from a power sensor of the electric bicycle, the power data representing the output power for the electric bicycle, and wherein the output power sensor is positioned at an output of the transmission, within a hub of a rear wheel of the electric bicycle, or on a frame of the electric bicycle.

* * * * *